April 15, 1952  J. ROBERTS  2,592,953
HIGH-PRESSURE FAUCET TYPE VALVE
Filed Dec. 1, 1948
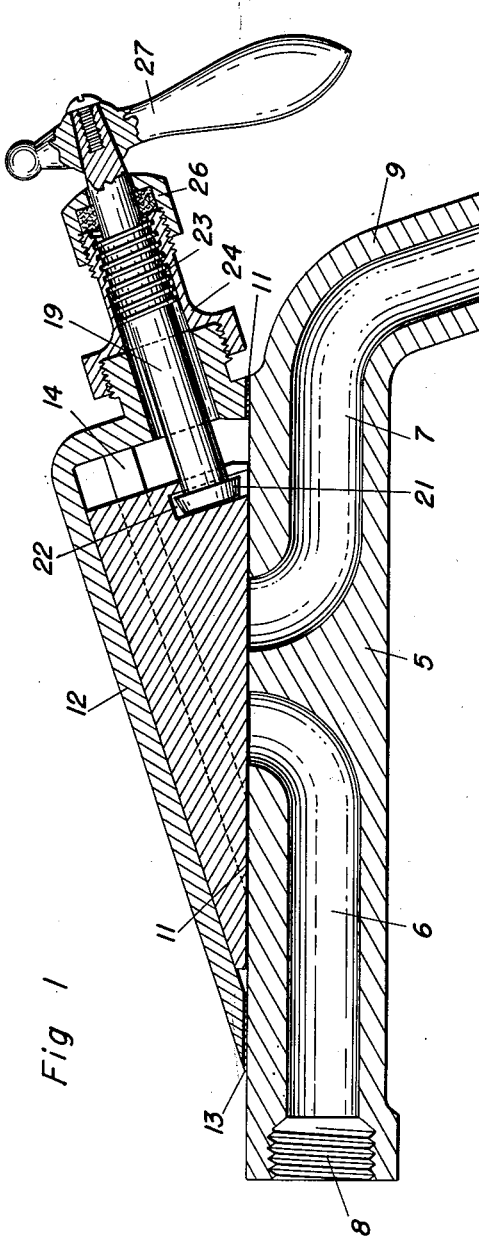
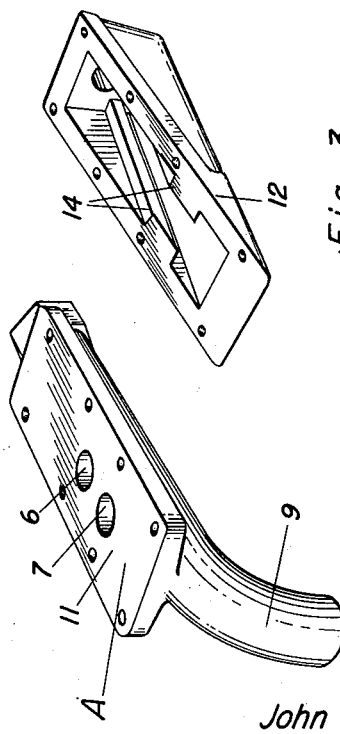
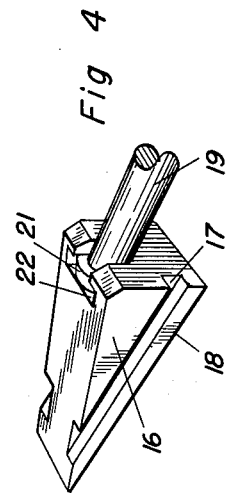
INVENTOR.
John Roberts
BY
Att'y Patented Apr. 15, 1952

2,592,953

UNITED STATES PATENT OFFICE 2,592,953

HIGH-PRESSURE FAUCET TYPE VALVE

John Roberts, San Francisco, Calif.

Application December 1, 1948, Serial No. 62,962

1 Claim. (Cl. 251—58)

This invention relates to improvements in valves and has particular reference to a high-pressure valve which may be used in any place where it is desired to interrupt the flow of liquid; as, for instance, in a faucet, straight-lined valve, angle valve, or the like.

The principal object of this invention is to provide a valve free of valve seat packing and one having a lapped seat.

A further object is to provide a valve wherein there is a sliding action between the valve and the valve seat, whereby the two surfaces are maintained in lapped condition.

A further object is to produce a valve of this character which is economical to manufacture, one which is easy to install and easy to operate.

Other objects and advantages will be apparent during the course of the following description.

In the accompanying drawings, forming a part of this specification and in which like numerals are employed to designate like parts throughout the same, Fig. 1 is a vertical cross section through a faucet constructed in accordance with my invention, Fig. 2 is a perspective view of the seat portion of the valve, Fig. 3 is a perspective view of the cap portion, and Fig. 4 is a perspective view of the valve wedge and a portion of the valve spindle.

The ordinary valve consists of a seat and a reciprocating valve in alignment therewith, which valve has a packing adapted to engage the seat and press there-against. This type of valve will not handle high pressures, for the reason that the packing quickly wears and leakage then occurs.

I have, therefore, produced a valve wherein the abutting surfaces are entirely of metal, lapped so that there is a uniform contact over the entire areas, thus forming a metal seal against which pressures cannot leak.

Referring to the accompanying drawings, wherein, for the purpose of illustration, is shown a preferred embodiment of my invention, the numeral 5 designates the body of the valve in which are formed passageways 6 and 7 and, in the present instance, the passage 6, is connected to an inlet pipe through the medium of threads 8, and the passage 7, terminates in a spout 9. Of course, any other arrangement could be employed without altering the spirit of this invention.

Both passages 6 and 7, extend upwardly and terminate in a valve seat 11. This valve seat consists of a relatively-large flat area, as best shown as a whole by the letter A in Fig. 2.

Positioned on the valve seat and secured thereto by suitable Allen head screws not shown, is a cap 12, which bears against a gasket 13, the function of which is obvious.

Within the cap 12, is a pair of opposed guide ribs 14, upon which is slidably mounted a valve wedge 16, through the medium of recesses 17, formed in the wedge.

The bottom of this wedge has a lapped surface 18, which is adapted to be moved into engagement with the valve seat 11, of the body 5.

In order to move this wedge upon the opposed guide ribs toward or away from the valve seat 11, I provide a spindle 19, having a disc-shaped head 21, adapted to engage a slotted recess 22, formed in the wedge and a threaded portion 23, formed in a removable bonnet 24, threadedly attached to the cap 12.

A packing gland is shown at 26, and a valve handle at 27, through the medium of which the spindle 19, may be rotated.

The result of this construction is that, when the spindle is rotated so as to force the lapped surface 18 of the valve against the lapped valve surface 11, the valve will shut off any flow of liquid from the passage 6, to the passage 7, and when the spindle is rotated in the opposite direction so as to slide the valve wedge on the ribs 14, the valve will be elevated away from the valve seat and, consequently, fluid may flow from one passage to the other.

With my construction, there is not only a wedging action, but a sliding action, which tends to force the valve against the seat and the combined sliding and compressing action of the two lapped surfaces tends to maintain a ground fit and to crush any small particles of sediment which might tend to lodge between the surfaces.

It will be noted that there is a slight play between the disc 21 and the slotted opening in which it rests. This permits a slight bumping action between the disc and the valve wedge, should the same be necessary in order to start the valve movement. It is a well-known fact that valves sometimes become stuck due to corrosion and, therefore, a slight bumping action will materially assist in moving the parts, should such a binding occur.

It will thus be seen that I have produced a device which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a valve of the character described, a body portion, passageways formed in said body portion, a valve seat formed on said body portion, the adjacent ends of said passageways terminating at said valve seat, a cap secured to said body portion, inclined guide ribs carried by said cap and inclined with respect to said valve seat, a valve having grooves slidable on said inclined ribs and having a co-acting planar surface adapted to engage said valve seat, whereby reciprocation of said valve on said ribs will move said co-acting planar surface into wedging action with said valve seat to seal the ends of said passageways.

JOHN ROBERTS.

REFERENCES CITED

The following references are of record in the file of this patent:

UNITED STATES PATENTS

| Number | Name | Date |
|---|---|---|
| 134,372 | Frank | Dec. 31, 1872 |
| 1,134,811 | Berger | Apr. 6, 1915 |
| 1,151,193 | Knox | Aug. 24, 1915 |
| 1,450,078 | Haunz | Mar. 27, 1923 |
| 1,720,938 | Veenshoten | July 16, 1929 |
| 1,882,227 | Mohr | Oct. 11, 1932 |
| 2,252,141 | Seidel | Aug. 12, 1941 |

FOREIGN PATENTS

| Number | Country | Date |
|---|---|---|
| 1,473 | Great Britain | June 1864 |